(12) United States Patent
Stevens et al.

(10) Patent No.: US 8,006,027 B1
(45) Date of Patent: Aug. 23, 2011

(54) METHOD OF STAGING SMALL WRITES ON A LARGE SECTOR DISK DRIVE

(75) Inventors: Curtis E. Stevens, Irvine, CA (US); Carl E. Bonke, Coto De Caza, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 538 days.

(21) Appl. No.: 12/209,081

(22) Filed: Sep. 11, 2008

(51) Int. Cl.
*G06F 12/00* (2006.01)
*G06F 12/10* (2006.01)

(52) U.S. Cl. ............ 711/4; 711/111; 711/113; 711/114; 711/170; 711/202; 711/203; 711/206

(58) Field of Classification Search .................. 711/111, 711/113
See application file for complete search history.

(56) References Cited

U.S. PATENT DOCUMENTS

| | | | |
|---|---|---|---|
| 5,613,066 A | 3/1997 | Matsushima et al. | |
| 5,813,025 A * | 9/1998 | Murphy et al. | ............... 711/114 |
| 5,822,142 A | 10/1998 | Hicken | |
| 6,035,351 A | 3/2000 | Billings et al. | |
| 6,092,231 A | 7/2000 | Sze | |
| 6,112,277 A | 8/2000 | Bui et al. | |
| 6,175,686 B1 | 1/2001 | Noda | |
| 6,191,712 B1 | 2/2001 | Still | |
| 6,324,604 B1 | 11/2001 | Don et al. | |
| 6,385,711 B1 | 5/2002 | Colligan | |
| 6,532,517 B1 | 3/2003 | Wagner et al. | |
| RE38,502 E | 4/2004 | Yonemitsu | |
| 6,751,686 B2 | 6/2004 | Takasugi et al. | |
| 6,988,178 B1 * | 1/2006 | Shirai et al. | ................... 711/200 |
| 7,076,603 B1 | 7/2006 | Chheda | |
| 7,099,993 B2 | 8/2006 | Keeler | |
| 7,330,417 B2 | 2/2008 | Billau et al. | |
| 7,461,202 B2 | 12/2008 | Forrer, Jr. et al. | |
| 7,539,924 B1 | 5/2009 | Vasquez et al. | |
| 7,574,558 B2 * | 8/2009 | Morley et al. | ................. 711/113 |
| 2004/0019718 A1 | 1/2004 | Schauer et al. | |
| 2004/0255093 A1 | 12/2004 | Forrer, Jr. et al. | |
| 2005/0036381 A1 | 2/2005 | Hassner et al. | |

* cited by examiner

*Primary Examiner* — Jack A Lane (57) ABSTRACT

A write command is received from a host computer at a disk drive having a disk. The write command is associated with a data block and a logical block address of the data block, and a logical sector size of the data block is smaller than a physical sector size of a physical sector on the disk associated with the logical block address. The data block is written to a staging sector located in non-volatile media of the disk drive based at least in part on the logical sector size being smaller than the physical sector size. A write response is sent to the host computer, the write response indicating that the write command has been completed. After sending the write response to the host computer, the data block is written to the physical sector on the disk.

45 Claims, 11 Drawing Sheets

METHOD OF STAGING SMALL WRITES ON A LARGE SECTOR DISK DRIVE

BACKGROUND

Magnetic disk drives are conventionally designed to store large volumes of data on a plurality of disks mounted on a spindle assembly. Typically, each disk includes two disk surfaces capable of storing data. On each disk surface, user data is divided into groups of physical data sectors and stored in concentric circular tracks located between an outside diameter and an inside diameter of the disk. Embedded servo information is recorded in servo sectors located in radially continuous narrow wedges along the disk surface.

Recently, many disk drive manufacturers have begun to increase the size of the individual physical sectors defined on the disk surfaces. For example, whereas in the past physical sectors each contained 512 bytes of user data, many disk drives now include 1 kilobyte, 2 kilobyte or 4 kilobyte physical sectors. These larger physical sectors have enabled improvements in disk drive capacity, performance, data integrity and manufacturing yield.

Unfortunately, legacy operating systems, BIOSes, host adapters and other host computer components are often not configured to take advantage of these larger physical sectors. In order to ensure backward compatibility, many newer disk drives must operate in an "emulation" mode, wherein a logical sector size exposed via a disk drive host interface to a host computer differs from the larger physical sector size used to store user data on the disk surface. For example, a disk drive may use a physical sector size of 4 kilobytes on its disk surfaces, while exchanging 512 byte logical sectors with a host computer.

Although such emulation has allowed newer disk drives to function properly with older host computers, the performance of these disk drives is often adversely impacted by the emulation. In particular, many newer disk drives operate in emulation mode using a "read-modify-write" schema. That is, when the disk drive receives a write command associated with a logical sector from the host computer, the disk drive reads a physical data block stored at a target physical sector, modifies a portion of the physical data block based upon the received user data, and finally writes the modified physical data block to the media. This extra read operation for each write command can significantly impact disk drive performance.

There is therefore a need in the art for an improved emulation schema for disk drives using physical sectors that are sized differently than logical sectors.

DETAILED DESCRIPTION

Figure 1:
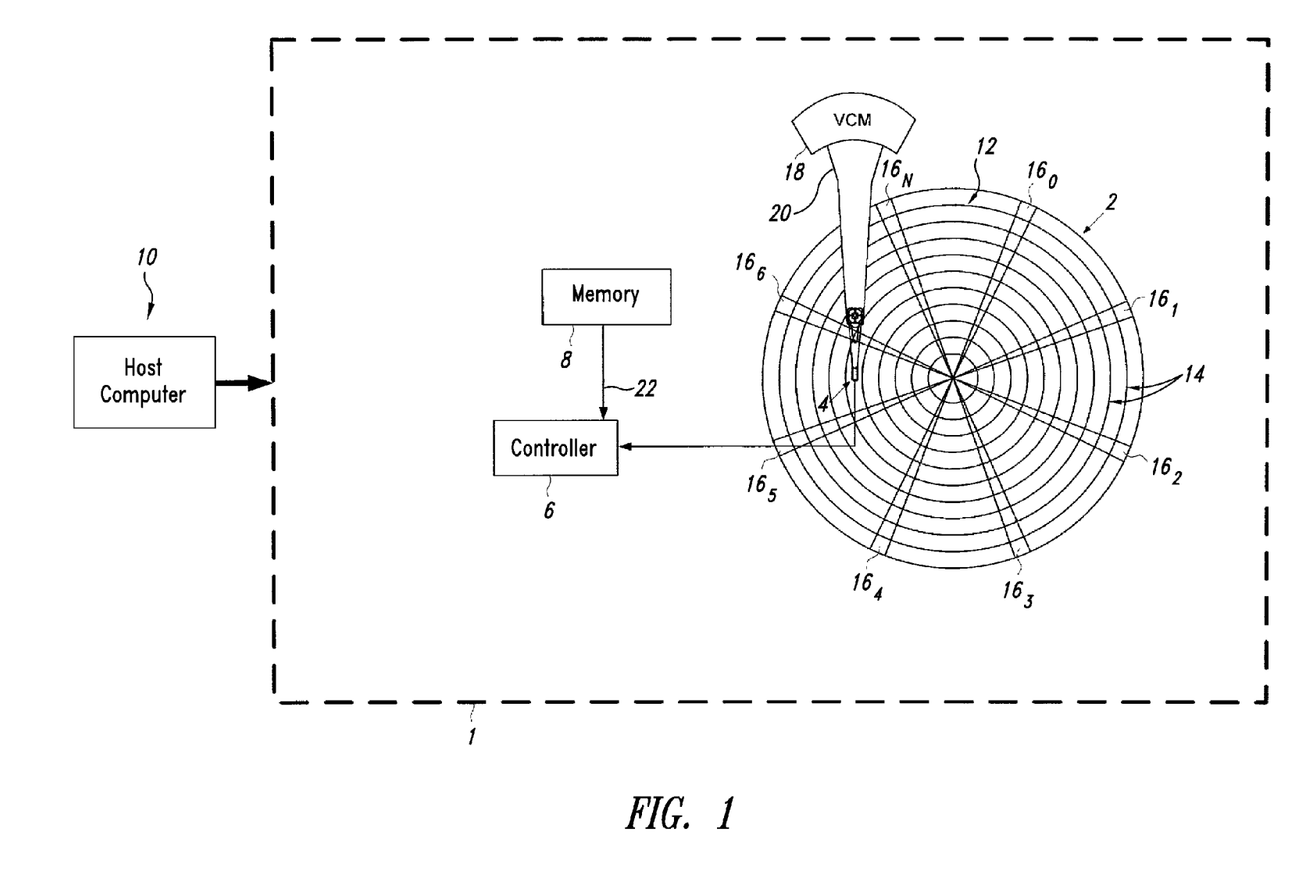
FIG. 1 is a schematic view generally illustrating an example disk drive, according to one illustrated embodiment.

Referring to FIG. 1, according to one embodiment, disk drive 1 comprises a disk 2, a head 4 actuatable over the disk 2, the head 4 operable to write to and read from the disk 2, a controller 6 operable to execute instructions, and a memory 8 coupled to the controller 6 and having computer-readable instructions stored thereon that are executable by the controller 6. In one embodiment, the instructions stored on the memory 8 may cause the controller 6 to process a write command received from a host computer 10, the write command associated with a data block and a logical block address of the data block, a logical sector size of the data block being smaller than a physical sector size of a physical sector on the disk 2 associated with the logical block address. The instructions stored on the memory 8 may cause the controller 6 to: write the data block to a staging sector located in non-volatile media of the disk drive 1 based at least in part on the logical sector size being smaller than the physical sector size; send a write response to the host computer 10, the write response indicating that the write command has been completed; and, after sending the write response to the host computer 10, write the data block to the physical sector on the disk 2.

As illustrated herein, the disk drive 1 comprises a magnetic disk drive, and the methods described herein will be described in terms of such a disk drive. However, the methods, circuitry and devices described herein may also be applied to and/or implemented in other disk drives, including, e.g., optical and magneto-optical disk drives.

The disk 2 may comprise any of a variety of magnetic or optical disk media. As illustrated, the disk 2 includes a disk surface 12, as well as an opposite disk surface not visible in FIG. 1. In one embodiment, the disk surface 12 comprises a plurality of generally concentric tracks 14 defined at least in part by a plurality of servo sectors $16_{0-N}$. These tracks 14 may comprise data tracks for receiving and storing user data from the host computer 10 in physical sectors. In other embodiments, more disks may, of course, be included in the disk drive 1, and different disk surfaces of these disks may be used for data storage.

The head 4 is actuatable over the disk 2 and is operable to write to and read from the disk 2. In one embodiment, the head 4 includes a transducer (not illustrated). The transducer may include a writer and a read element. In magnetic recording applications, the transducer's writer may be of a longitudinal or perpendicular design, and the read element of the transducer may be inductive or magneto-resistive. In optical or magneto-optical recording applications, the head 4 may include an objective lens and an active or passive mechanism for controlling a separation of the objective lens from the disk surface 12.

As illustrated, the disk drive 1 may further include a voice coil motor (hereinafter referred to as a "VCM") 18 for rotating one or more actuator arms 20 about a pivot in order to actuate the head 4 at different positions over the disk surface 12. Of course, other actuating mechanisms may also be used to move the head 4 relative to the disk 2.

The controller 6 is configured to execute one or more instructions in order to control certain operations performed by the disk drive 1. For example, the controller 6 may interpret disk access commands received from the host computer 10 and based on such commands may determine which data to send to or receive from a read channel. The controller 6 may also perform error correction and detection routines on data read from the disk 2. In one embodiment, a processing unit of the controller 6 is configured to execute computer-readable instructions stored on the memory 8, which is communicatively coupled thereto by at least one data line 22.

The memory 8 may comprise any type of volatile or non-volatile computer-readable memory, such as dynamic random access memory (DRAM) or flash memory. As illustrated, the memory 8 comprises a memory module separate and distinct from the disk 2. However, in other embodiments, various instructions executable by the controller 6 may be stored on the disk 2.

The memory 8 may have a variety of information stored thereon. This stored information may include, inter alia: data read from the disk 2, data representative of operating parameters of the disk drive 1, and op codes of control programs for controlling operations performed by the controller 6. In one embodiment, as set forth above, the memory 8 may store instructions that are executable by the controller 6 in order to cause the controller 6 to process a write command received from a host computer 10 by performing a number of acts enumerated and discussed in detail below with respect to FIGS. 3A and 3B.

The host computer 10 coupled to the disk drive 1 may comprise a personal computer or server computing system, within which the disk drive 1 may be incorporated. In other embodiments, the host computer 10 may comprise any of a plurality of computing systems communicatively coupled to the disk drive 1.

In other embodiments, the methods, circuitry and devices described herein may be applied to and/or implemented in other storage devices that do not include rotating media, such as flash memory devices. In such embodiments, an electronic storage device may comprise media, a controller operable to execute instructions, and a memory having computer-readable instructions stored thereon that are executable by the controller. In one embodiment, the instructions stored on the memory may cause the controller to process a write command received from a host computer, the write command associated with a data block and a logical block address of the data block, a logical sector size of the data block being smaller than a physical sector size of a physical sector on the media associated with the logical block address. The instructions stored on the memory may cause the controller to: write the data block to a staging sector located in non-volatile media of the electronic storage device based at least in part on the logical sector size being smaller than the physical sector size; send a write response to the host computer, the write response indicating that the write command has been completed; and, after sending the write response to the host computer, write the data block to the physical sector on the media.

Figure 2:
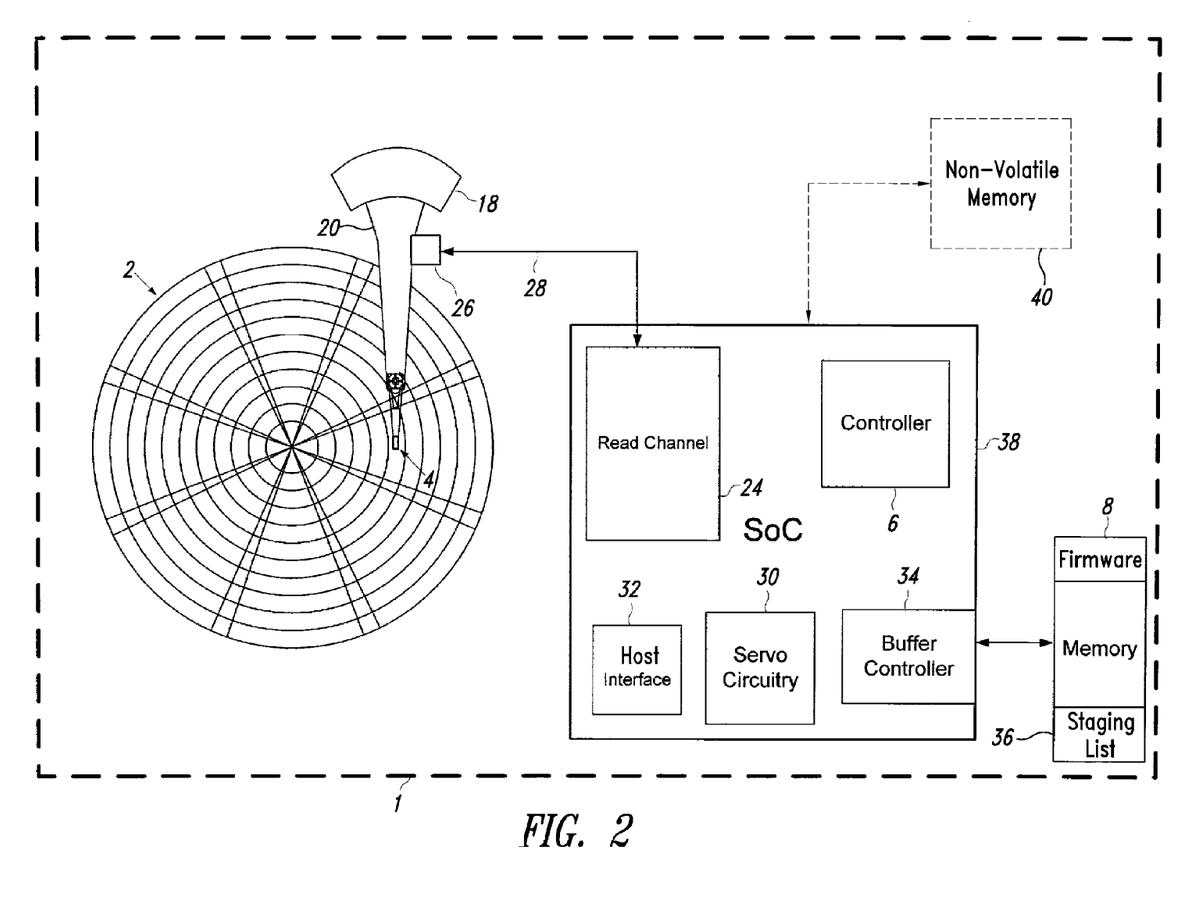
FIG. 2 is a schematic view illustrating in greater detail the example disk drive of FIG. 1, according to one illustrated embodiment.

Referring to FIG. 2, additional circuitry for controlling various functions of the disk drive 1 is illustrated in greater detail. However, in other embodiments, at least some of the illustrated circuitry may be omitted.

As illustrated in FIG. 2, the disk drive 1 may further include a read channel 24. The read channel 24 may be coupled to a preamplifier 26 via a plurality of read and write lines 28. The preamplifier 26 may be located on the actuator 20 within the disk drive 1, or at a variety of other locations. During a read operation, the preamplifier 26 may amplify an analog signal detected by the head 4 in order to achieve a signal level that can be processed by the read channel 24. The read channel 24 may then receive the amplified signal via one of the lines 28 and further amplify, filter and convert the analog pulses into digital data that is output to the controller 6. During a write operation, the read channel 24 may receive digital data from the controller 6 and forward logical signals representative of this digital data to the preamplifier 26 via the lines 28.

The disk drive 1 may further comprise servo circuitry 30. In one embodiment, the servo circuitry 30 receives a position signal via the preamplifier 26 and the read channel 24 and performs calculations to determine a current position of the head 4 over the disk 2. The servo circuitry 30 then uses these calculations in order to control the VCM 18, and thereby control the position of the head 4.

Disk drive 1 may further include a disk drive host interface 32 that mediates communication with the host computer 10. In one embodiment, the disk drive host interface 32 receives commands and data from and transmits status and data to the host computer 10. The disk drive host interface 32 may comply with any of a number of technical standards. In one embodiment, the disk drive host interface 32 may include a serial interface, such as a Serial Advanced Technology Attachment ("SATA") interface or a Serial Attached Small Computer System Interface ("SAS"). In another embodiment, a parallel interface may be used, such as an Advanced Technology Attachment/Integrated Drive Electronics ("ATA/IDE") interface or a Small Computer System Interface ("SCSI").

The disk drive 1 may further comprise a buffer controller 34 directly coupled to the memory 8. The buffer controller 34 arbitrates access to the memory 8 by other circuit components. As illustrated, the memory 8 may include firmware and other computer-readable instructions executable by the controller 6. In one embodiment, the memory 8 may further include a staging list 36, described in greater detail below.

As illustrated, many of the circuit components may be incorporated into a system on a chip ("SoC") 38. Thus, a single piece of silicon may incorporate the functionality of many of the above-described components. In other embodiments, the circuit components described herein may be implemented on a printed circuit board ("PCB") as separate elements.

In one embodiment, the disk drive 1 may further comprise a non-volatile memory 40, separate from the disk 2 and the memory 8. The non-volatile memory 40 may comprise any of a plurality of non-volatile storage elements, e.g., Electrically Erasable Programmable Read-Only Memory ("EEPROM"), flash memory, Magnetoresistive Random Access Memory ("MRAM"), etc. In other embodiments, the disk drive 1 may lack a separate non-volatile memory 40 and may include only the disk 2 and the memory 8.

Figure 3A:
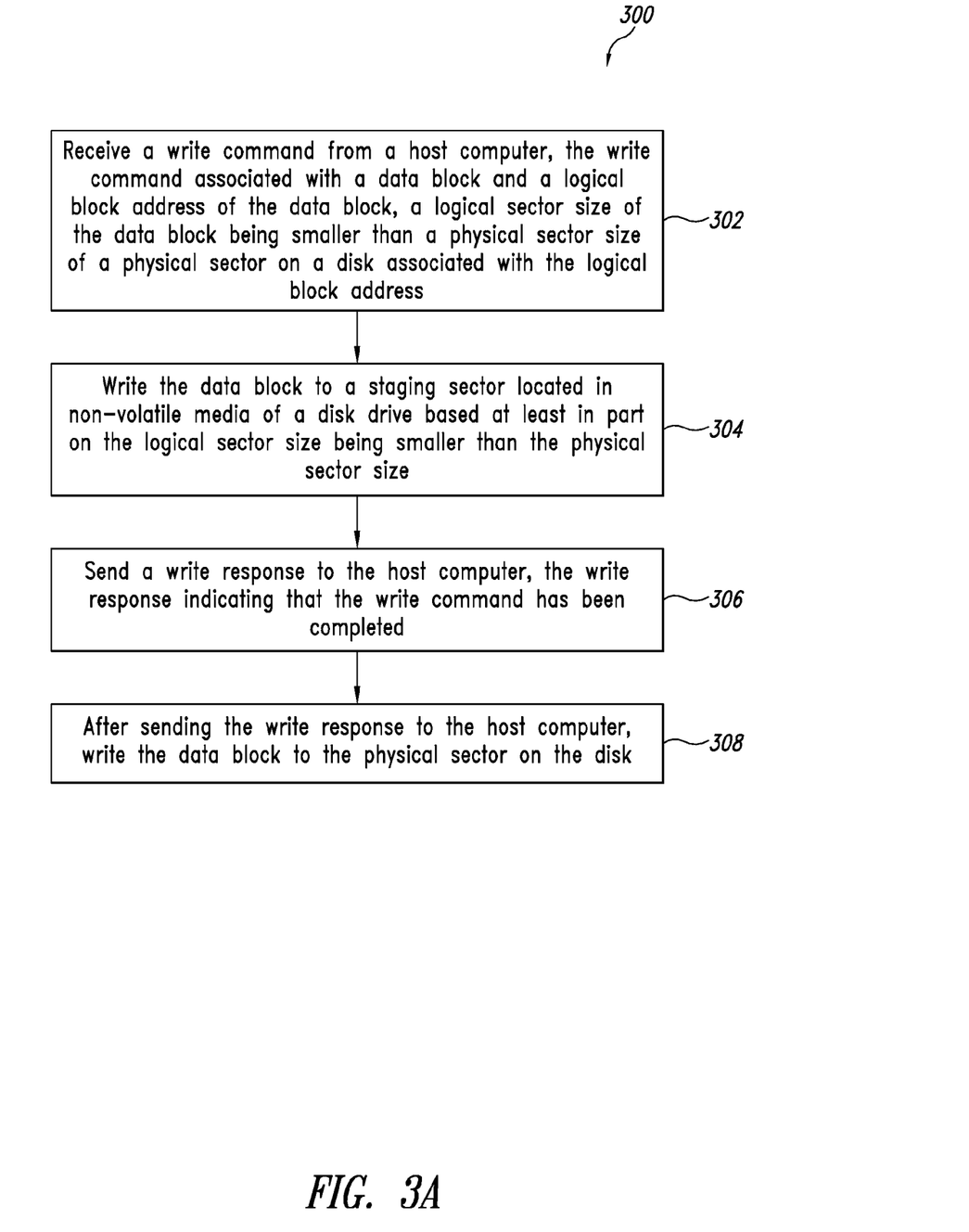
FIG. 3A is a flow chart illustrating one method of operating a disk drive, according to one illustrated embodiment.

FIG. 3A illustrates a flow diagram for a method 300 of operating a disk drive, according to one embodiment. The method 300 will be discussed in the context of the disk drive 1 of FIGS. 1 and 2 with reference to FIGS. 4-6. However, the acts disclosed herein may be executed in a variety of different disk drives or other storage devices, in accordance with the described method.

As described herein, all of the acts comprising the method 300 may be orchestrated by the controller 6 based at least in part on execution of computer-readable instructions stored in the memory 8. In other embodiments, a hardware implementation of all or some of the acts of the method 300 may be used.

At act 302, a write command is received from a host computer 10, the write command associated with a data block and a logical block address of the data block, a logical sector size of the data block being smaller than a physical sector size of a physical sector on a disk 2 associated with the logical block address. As used herein, a logical block address ("LBA") refers to an identifier for a logical memory location in the disk drive 1 that is used in communications between the disk drive 1 and the host computer 10. That is, an LBA comprises an identifier used by the host computer 10 to identify those memory locations to which the host computer 10 wishes to read or write a data block. A logical sector, in turn, refers to the memory location identified by an LBA, and a logical sector size is defined by the size of the data block identified by a single LBA. In contrast, a physical block address ("PBA") refers to an identifier that is used within the disk drive 1 to identify a memory location (e.g., on the disk 2). A physical sector therefore refers to the memory location identified by a PBA, and a physical sector size is defined by the size of a data block identified by a single PBA.

Figure 4:
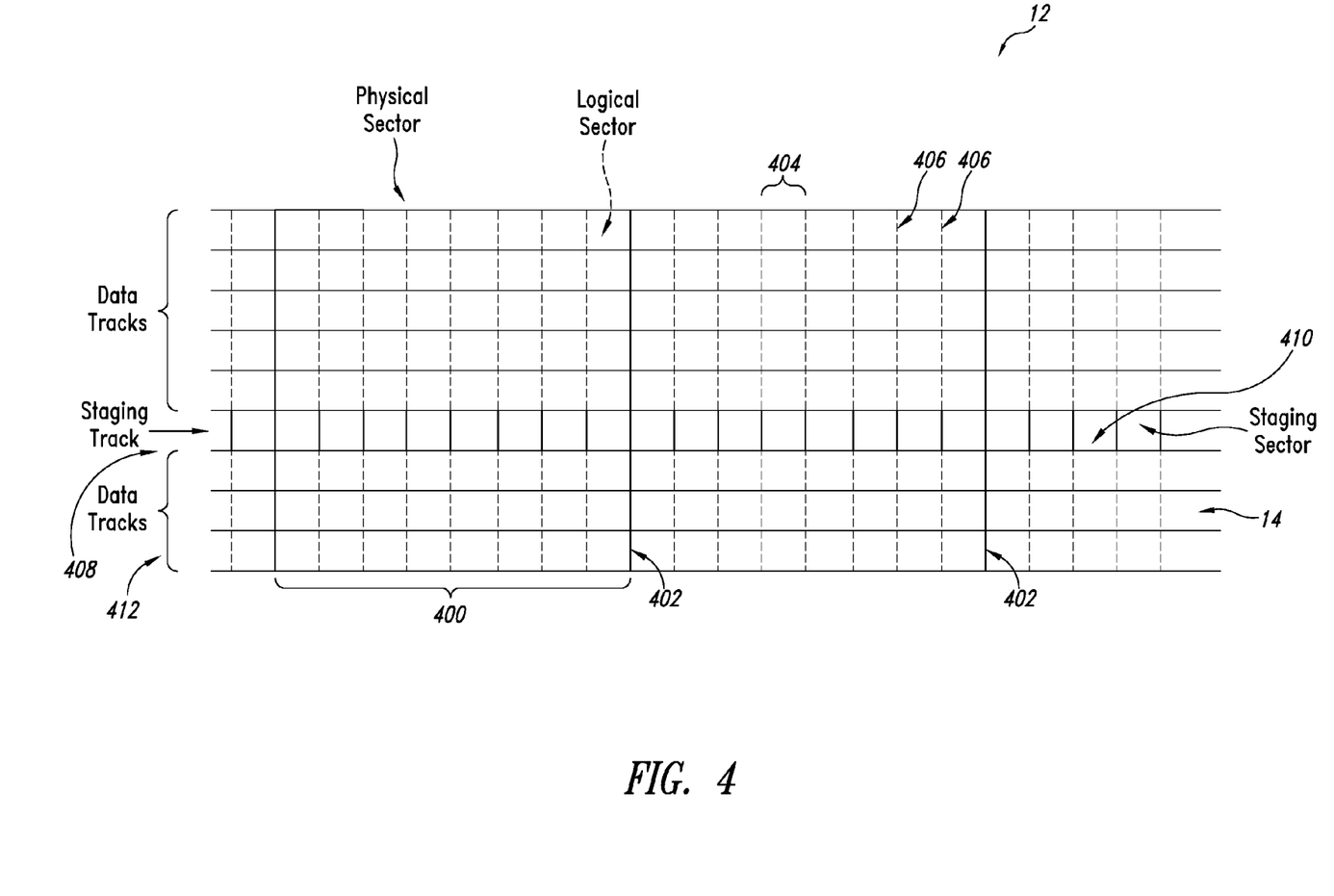
FIG. 4 is a schematic view of an example pattern of tracks on a disk surface of the disk drive of FIG. 1, according to one illustrated embodiment.

One exemplary relationship between logical sectors and physical sectors on the disk 2 is illustrated in the schematic view of the disk surface 12 of FIG. 4. As shown therein, tracks 14 of the disk surface 12 are divided into physical sectors 400 delineated by solid lines representing physical sector boundaries 402. Such physical sector boundaries 402 may comprise formatting boundaries on the disk surface 12, and the disk drive 1 may identify each physical sector 400 with a corresponding PBA. Meanwhile, logical sectors 404 are delineated by dashed lines representing logical sector boundaries 406. Typically, these logical sector boundaries 406 are not reflected by formatting on the disk surface 12. Instead, the disk drive 1 may include a mapping function or table for correlating each logical sector 404 (and its associated LBA) with a particular location within a physical sector 400 having an associated PBA.

The write command received from the host computer 10 may comprise any of a plurality of write commands formatted and transmitted in accordance with the technical standards used for communication between the host computer 10 and the disk drive 1. In one embodiment, the write command may comprise a command formatted in accordance with SATA specifications, SCSI specifications, etc. The write command may also include a variety of parameters for controlling a write operation of the disk drive 1.

Figure 5:
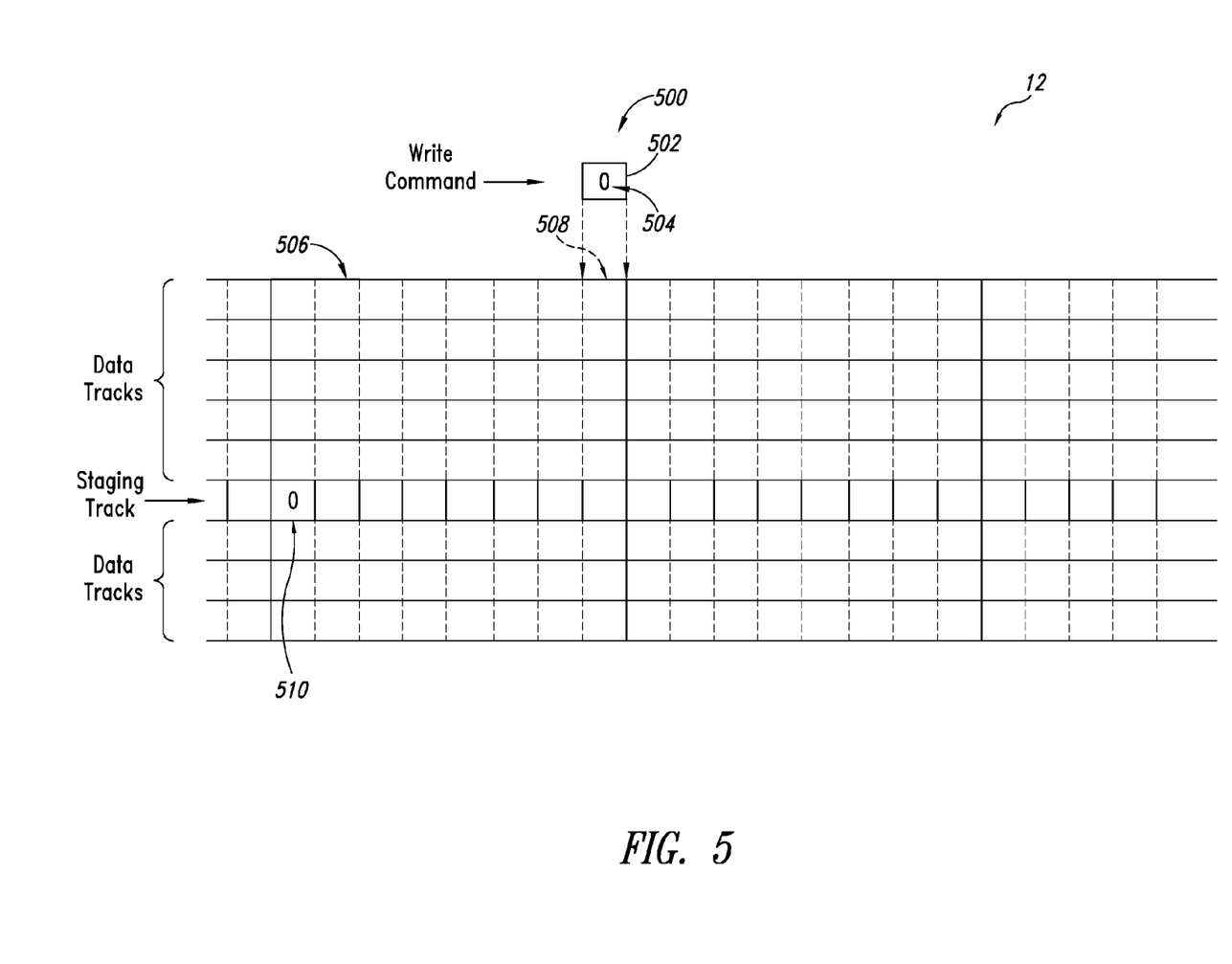
FIG. 5 is a schematic view of the disk surface of FIG. 4 after a staging operation has been performed, based on a write command associated with a single data block, according to one illustrated embodiment.

The write command may be associated with one or more data blocks sent by the host computer 10 for storage on the disk drive 1. In one embodiment, as illustrated in FIG. 5, a write command 500 may be associated with a single data block 502 and a logical block address 504 of that data block 502. For example, the write command 500 may be sent to the disk drive 1 and followed by signals indicative of the data block 502 and the LBA 504. Although illustrated as a "0" for the sake of simplicity, the LBA 504 may comprise any identifier and may be formatted in accordance with a variety of numbering schemes used by the host computer 10 to identify logical sectors. In one embodiment, the LBA 504 is associated with a physical sector 506 on the disk 2. That is, the LBA 504 identifies a logical sector 508, which comprises at least a portion of the physical sector 506.

As illustrated in FIG. 5, the logical sector size of the data block 502 is smaller than a physical sector size of the physical sector 506 on the disk 2 associated with the LBA 504. Thus, in one embodiment, the logical sector size used by the host computer 10 is smaller than the physical sector size used by the disk drive 1. For example, as illustrated, the host computer 10 may send a 512 byte data block 502, which the disk drive 1 may store in a 4 kilobyte physical sector 506. In such an embodiment, each physical sector on the disk drive 1 may include up to eight logical sectors. In other embodiments, different sizes and ratios for the logical sectors and physical sectors may be used. For example, the host computer 10 may use 512 byte logical sectors, while the disk drive 1 uses 1 kilobyte, 2 kilobyte, 8 kilobyte or larger physical sectors. In another example, the host computer 10 may use 1 kilobyte or larger logical sectors.

As indicated above, in some embodiments, other storage devices may also be used to implement this method 300. In such embodiments, a write command may be received from a host computer at an electronic storage device, the write command associated with a data block and a logical block address of the data block, a logical sector size of the data block being smaller than a physical sector size of a physical sector on media of the electronic storage device associated with the logical block address. Such media may comprise for example flash memory. Much of the description above may be applied to this embodiment as well.

At act 304, the data block 502 is written to a staging sector located in non-volatile media of a disk drive 1 based at least in part on the logical sector size being smaller than the physical sector size. The staging sector may be located in a variety of non-volatile media in the disk drive 1. In one embodiment, as illustrated in FIG. 4, the non-volatile media may comprise physical locations on the disk 2. For example, the disk 2 may include a pattern of tracks 14 including staging tracks 408 associated with staging sectors 410 alternating with addressable data tracks 412 associated with physical sectors 400. Thus, writing the data block 502 to one of the staging sectors 410 may include writing the data block 502 to one of the staging tracks 408.

The pattern of tracks may comprise any non-zero number of consecutive addressable data tracks 412 alternating with any non-zero number of staging tracks 408. This pattern of tracks may then be repeated across at least a portion of the disk surface 12 and, in one embodiment, may be repeated across the entirety of the disk surface 12 that is accessible by the head 4. In one embodiment, between 50 and 150 consecutive addressable data tracks 412 may alternate with between 1 and 5 staging tracks 408 across the disk 2. The pattern of tracks may also vary across the disk 2. For example, a first number of addressable data tracks 412 may alternate with a second number of staging tracks 408 near an outer diameter of the disk 2, while a third number of addressable data tracks 412 may alternate with a fourth number of staging tracks 408 near an inner diameter of the disk 2.

As illustrated, a staging sector size of the staging sectors 410 may be substantially equal to the logical sector size of the data block 502 received from the host computer 10. Thus, in one embodiment, the disk 2 may be formatted differently across the disk surface 12. Certain portions of the disk 2 may be formatted using physical sector sizes, while other portions of the disk 2 may be formatted using staging sector sizes.

In another embodiment, the disk 2 may include fewer and larger staging track areas on the disk surface 12. For example, the disk 2 may not alternate data tracks with staging tracks, but may instead set aside a reserved area of the disk 2 close to an inner diameter of the disk 2 for a relatively large number of staging tracks. In another embodiment, the non-volatile media may comprise a separate non-volatile memory 40 apart from the disk 2, as illustrated in FIG. 2. For example, the non-volatile memory 40 may comprise a non-volatile flash memory. In such an embodiment, the data block 502 may be written to a staging sector located in the non-volatile flash memory.

In one embodiment, the staging sector 510 is not logically addressable by the host computer 10. Thus, the host computer 10 may not inadvertently access the data managed by the disk drive 1 in the staging sector 510. Of course, in other embodiments, the staging sector 510 may be logically addressable by the host computer 10 (e.g., by a special set of commands).

As illustrated in FIG. 5, the data block 502 is written to a staging sector 510 on the disk 2. This process may be referred to as a "staging operation," as the data block 502 is not immediately written to the target logical sector 508. In different embodiments, the data block 502 may be written to any of the available staging sectors 410. For example, in one embodiment, the data block 502 may be preferentially written to the staging track 408 that is nearest the data track including the target logical sector 508. In other embodiments, based on seek and tracking algorithms, the data block 502 may be written to whichever staging sector 410 in the staging track 408 can be reached most quickly. In still other embodiments, the data block 502 may be written to a particular staging sector 410 based at least in part on the LBA 504 of the data block 502.

In one embodiment, the staging operation is performed based at least in part on the logical sector size of the data block 502 being smaller than the physical sector size of the corresponding physical sector 506. That is, the staging operation may be performed only if the logical sector size is smaller than the physical sector size. The controller 6 may further determine that additional data blocks (not shown) associated with additional write commands do not fill the physical sector 506 associated with the logical block address 504. Based at least in part on the determination that additional data blocks do not fill the physical sector 506, the data block 502 may be written to the staging sector 510. Thus, in one embodiment, if the physical sector 506 will be filled with data blocks from other write commands, the controller 6 may write all of those data blocks together with the data block 502 to the physical sector 506. However, if a read-modify-write or other emulation-mode operation is necessary in order to write the data block 502 to the physical sector 506, then the controller 6 may perform a staging operation.

The disk drive 1 may use any of a variety of methods for determining which data blocks are stored in which staging sectors. In one embodiment, a staging list 36 associating the staging sector 510 with the LBA 504 of the data block 502 may be created. The staging list 36 may have any of a variety of formats for associating staging sector identifiers with LBAs. In this embodiment, if the host computer 10 should later attempt to access the LBA 504, the disk drive 1 may respond based on the information stored in the staging list 36. In one embodiment, the staging list 36 may be stored in the memory 8, as illustrated in FIG. 2. However, in other embodiments, the staging list 36 may be stored on non-volatile media (e.g., on the disk 2 or the non-volatile memory 40).

In embodiments implemented in other storage devices, the data block may be written to a staging sector located in non-volatile media of the electronic storage device based at least in part on the logical sector size being smaller than the physical sector size. Such non-volatile media may be separate from primary storage media of the electronic storage device, or may comprise portions of that primary storage media. Much of the description above may be applied to this embodiment as well.

At act 306, a write response is sent to the host computer 10, the write response indicating that the write command has been completed. The write response (not shown) may comprise any of a plurality of write responses formatted and transmitted in accordance with the technical standards used for communication between the host computer 10 and the disk drive 1. In one embodiment, act 306 is performed after act 304, although in other embodiments, these acts may be performed substantially simultaneously.

In one embodiment, the disk drive 1 may be in a Forced Unit Access ("FUA") mode. In such a mode, the disk drive 1 must write the data block 502 specified in the write command 500 to non-volatile media before sending a write response to the host computer 10 indicating that the write command has been completed. In such an embodiment, if a staging operation as described in act 304 has been performed, the disk drive 1 may respond with an affirmative write response even though the data block 502 has not yet been written to the physical sector 506 associated with the LBA 504 of the data block 502.

In other embodiments, act 306 need not be performed. Indeed, in some embodiments, the host computer 10 may not require a write response from the disk drive 1.

Figure 6:
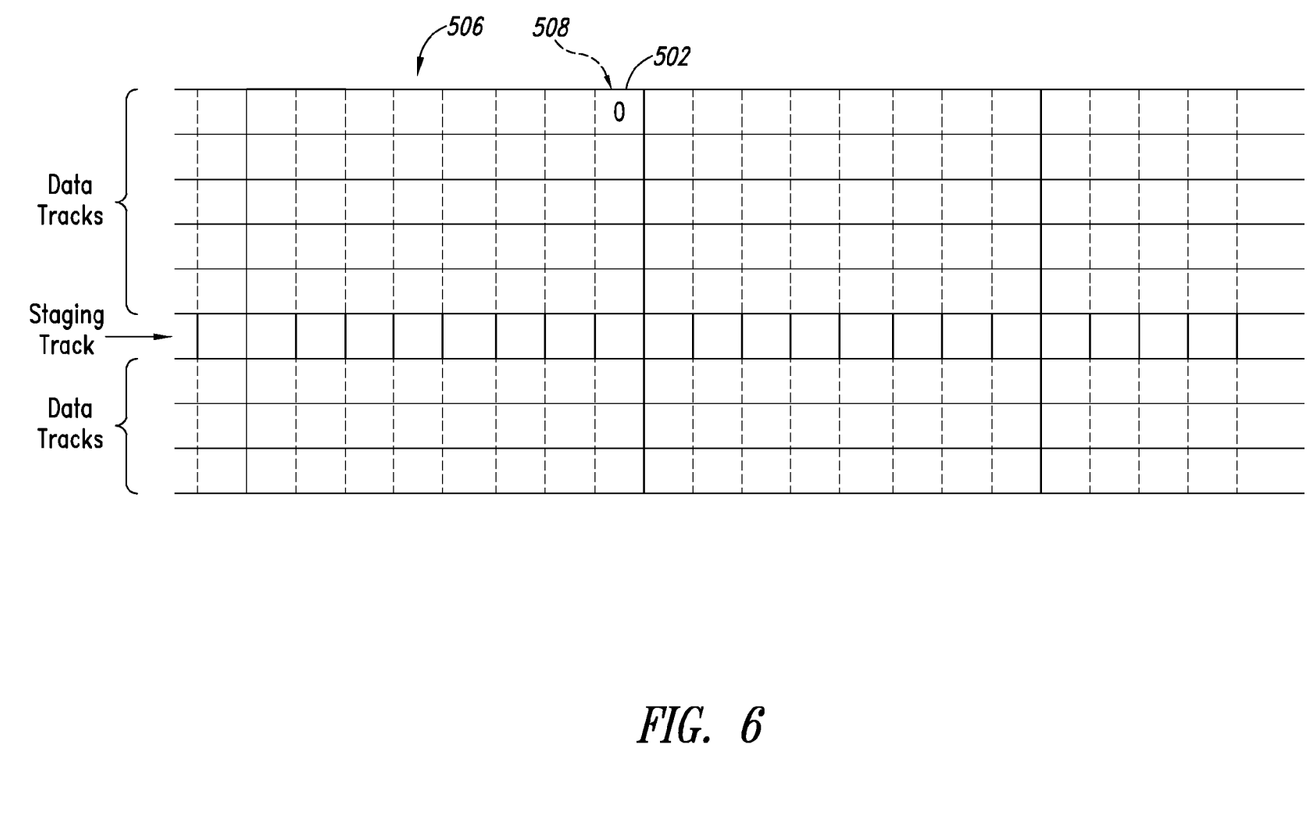
FIG. 6 is a schematic view of the disk surface of FIG. 4 after a write operation has been performed, based on the write command staged at FIG. 5, according to one illustrated embodiment.

At act 308, after sending the write response to the host computer 10, the data block 502 is written to the physical sector 506 on the disk 2. In one embodiment, as illustrated in FIGS. 5 and 6, the disk drive 1 may copy the data block 502 from the staging sector 510 to the physical sector 506 associated with the LBA 504 of the data block 502. As illustrated, the data block 502 may be written to the physical sector 506 at an appropriate location corresponding to the LBA 504.

In one embodiment, writing the data block 502 to the physical sector 506 may include the following acts: reading a physical data block stored at the physical sector 506, modifying the physical data block to include the data block 502, and writing the modified physical data block to the physical sector 506. In one embodiment, the data block 502 may be cached in the memory 8 during this writing operation, and the physical data block read from the physical sector 506 may be modified to include the data block 502 as stored in the memory 8, without accessing the staging sector 510. In another embodiment, the data black 502 may be read from the staging sector 510, and then the physical data block may be modified to include the data block 502.

In one embodiment, in order to ensure that the physical data block stored at the physical sector 506 is always on non-volatile media, the following acts may also be performed. After reading the physical data block stored at the physical sector 506, portions of the physical data block may be written to additional staging sectors proximate the staging sector 510 storing the data block 502. For example, in one embodiment, the staging sectors near the staging sector 510 may be filled with those logical data sectors from the physical data block that will not be replaced by the data block 502. In one embodiment, the logical data sectors may be written to the staging sectors in an arrangement identical to that of the logical data sectors in the physical data block. The portions of the physical data block written to the staging sectors and the data block 502 may form the modified physical data block. Thus, in one embodiment, the modified physical data block may be read from the staging sector 510 and from the additional staging sectors before being written to the physical sector 506.

The act 308 may be performed at any time after sending the write response to the host computer 10. In one embodiment, the data block 502 may be written to the physical sector 506 on the disk 2 while the disk drive 1 is receiving a relatively low frequency of commands from the host computer 10. For example, the data block 502 may be written to the physical sector 506 on the disk 2 while the disk drive 1 is in an idle state. In another embodiment, the data block 502 may be written to the physical sector 506 on the disk 2 during at least one of a startup process and a shutdown process of the disk drive 1. In still another embodiment, the data block 502 may be written to the physical sector 506 in response to a flush command from the host computer 10. For example, a flush command may cause the disk drive 1 to move all data blocks staged by the disk drive 1 to their respective physical sectors.

In embodiments implemented in other storage devices, the data block may be written to a physical sector on the media of the electronic storage device after a write response is sent to the host computer. Much of the description above may be applied to this embodiment as well.

Figure 3B:
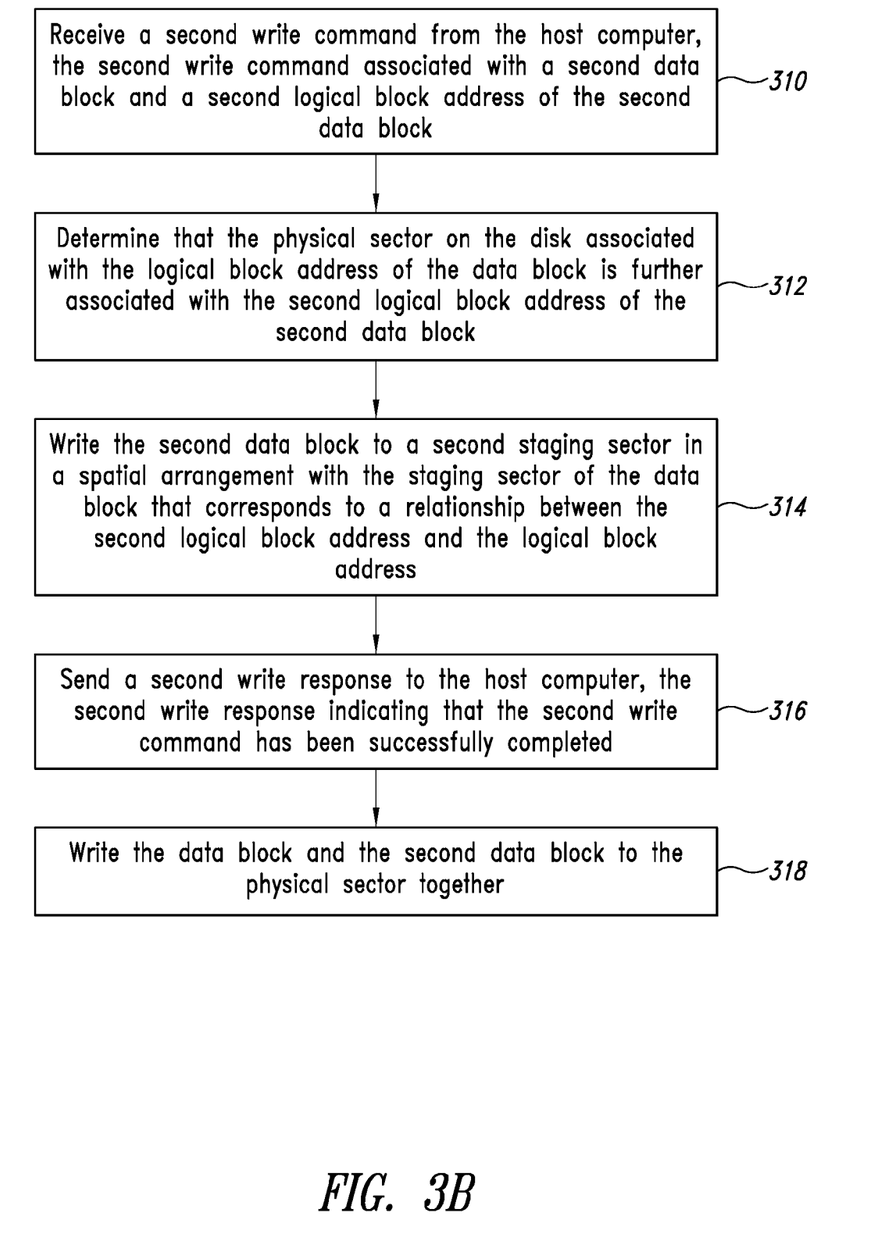
FIG. 3B is a flow chart illustrating additional acts that may be carried out in accordance with the method of FIG. 3A, according to one illustrated embodiment.

Acts 302 and 304 of method 300 of FIG. 3A will now be discussed in the context of FIGS. 7-10 (with reference to the disk drive 1 of FIGS. 1 and 2). The above description of acts 306 and 308 may be applied to this embodiment as well. FIG. 3B will also be discussed, as it illustrates additional acts that may be carried out in accordance with the method 300.

At act 302, a write command is received from a host computer 10, the write command associated with a data block and a logical block address of the data block, a logical sector size of the data block being smaller than a physical sector size of a physical sector on a disk 2 associated with the logical block address.

Figure 7:
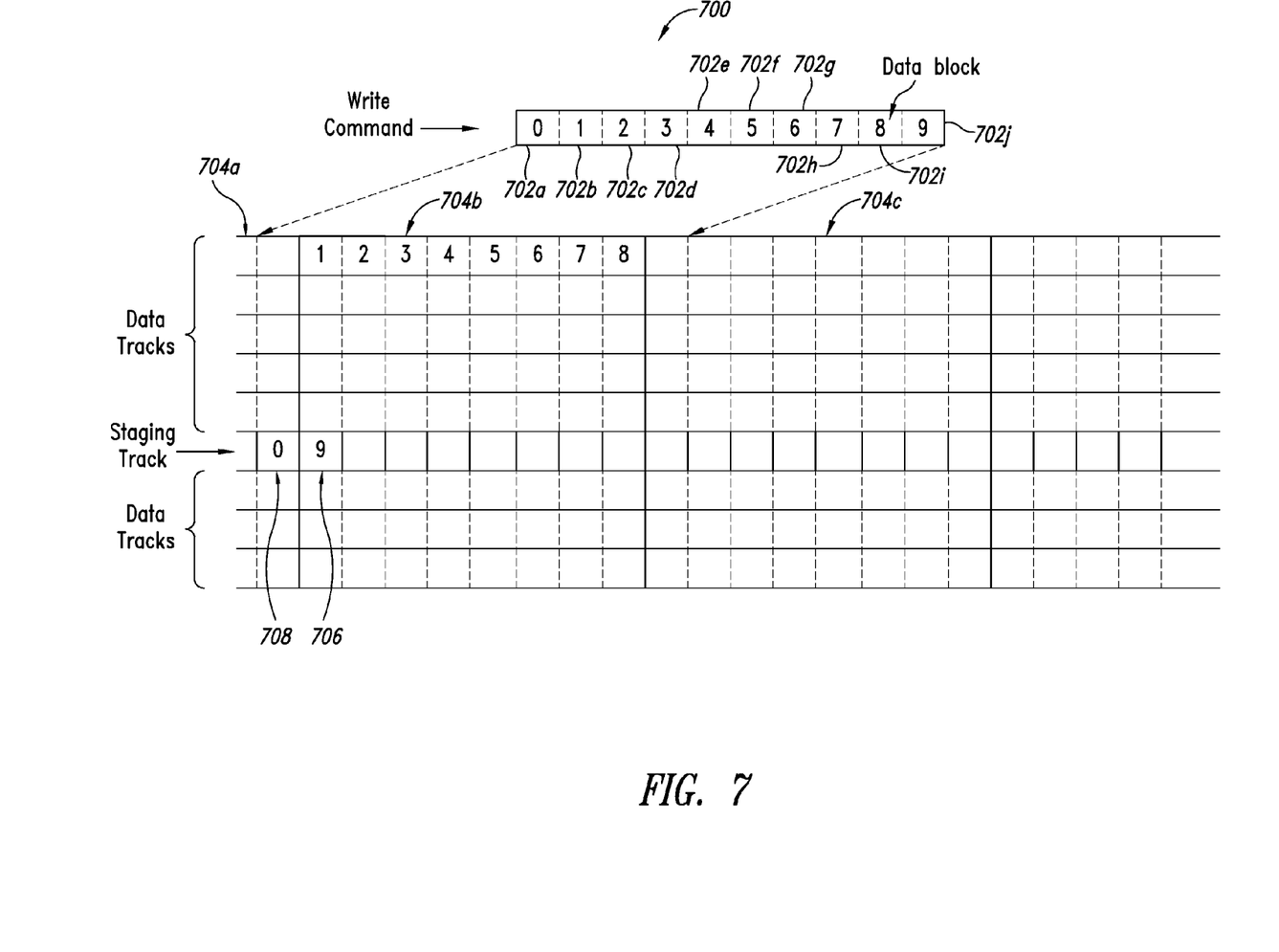
FIG. 7 is a schematic view of the disk surface of FIG. 4 after a partial staging operation has been performed, based on a write command associated with a plurality of data blocks, according to one illustrated embodiment.

The write command 700 of FIG. 7 is associated with a plurality of data blocks 702a-j (collectively 702) and corresponding LBAs. In particular, the write command 700 is associated with a data block 702j and an LBA ("9") of that data block 702j. A logical sector size of the data block 702j is smaller than a physical sector size of a physical sector 704c on the disk 2 associated with the LBA.

At act 304, the data block 702j is written to a staging sector located in non-volatile media of a disk drive 1 based at least in part on the logical sector size being smaller than the physical sector size.

As illustrated in FIG. 7, the data block 702j is written to a staging sector 706 located on the disk 2 based at least in part on the logical sector size being smaller than the physical sector size of the physical sector 704c. In addition, another data block 702a is written to another staging sector 708 based at least in part on the logical sector size of the data block 702a being smaller than the physical sector size of a corresponding physical sector 704a. Thus, a single write command 700 may be associated with a plurality of data blocks that are written to corresponding staging sectors.

In one embodiment, it may be determined that the additional data blocks 702 associated with the write command 700 do not fill the physical sector 704c associated with the LBA of the data block 702j. Based at least in part on this determination, the data block 702j may be written to the staging sector 706. Similarly, it may be determined that the additional data blocks 702 associated with the write command 700 do not fill the physical sector 704a associated with the LBA of the data block 702a. Based at least in part on this determination, the data block 702a may be written to the staging sector 708. On the other hand, since the physical sector 704b can be filled by data blocks 702b-i associated with the write command 700, the controller 6 may write all of the data blocks 702b-i to the physical sector 704b, and not to staging sectors. However, in other embodiments, the controller 6 may still write all of the data blocks 702b-i to staging sectors in spite of the fact that these data blocks 702b-i can fill the physical sector 704b.

At act 310, a second write command is received from the host computer 10, the second write command associated with a second data block and a second logical block address of the second data block. This second write command may be formatted similarly to the write command 500 described above.

Figure 8:
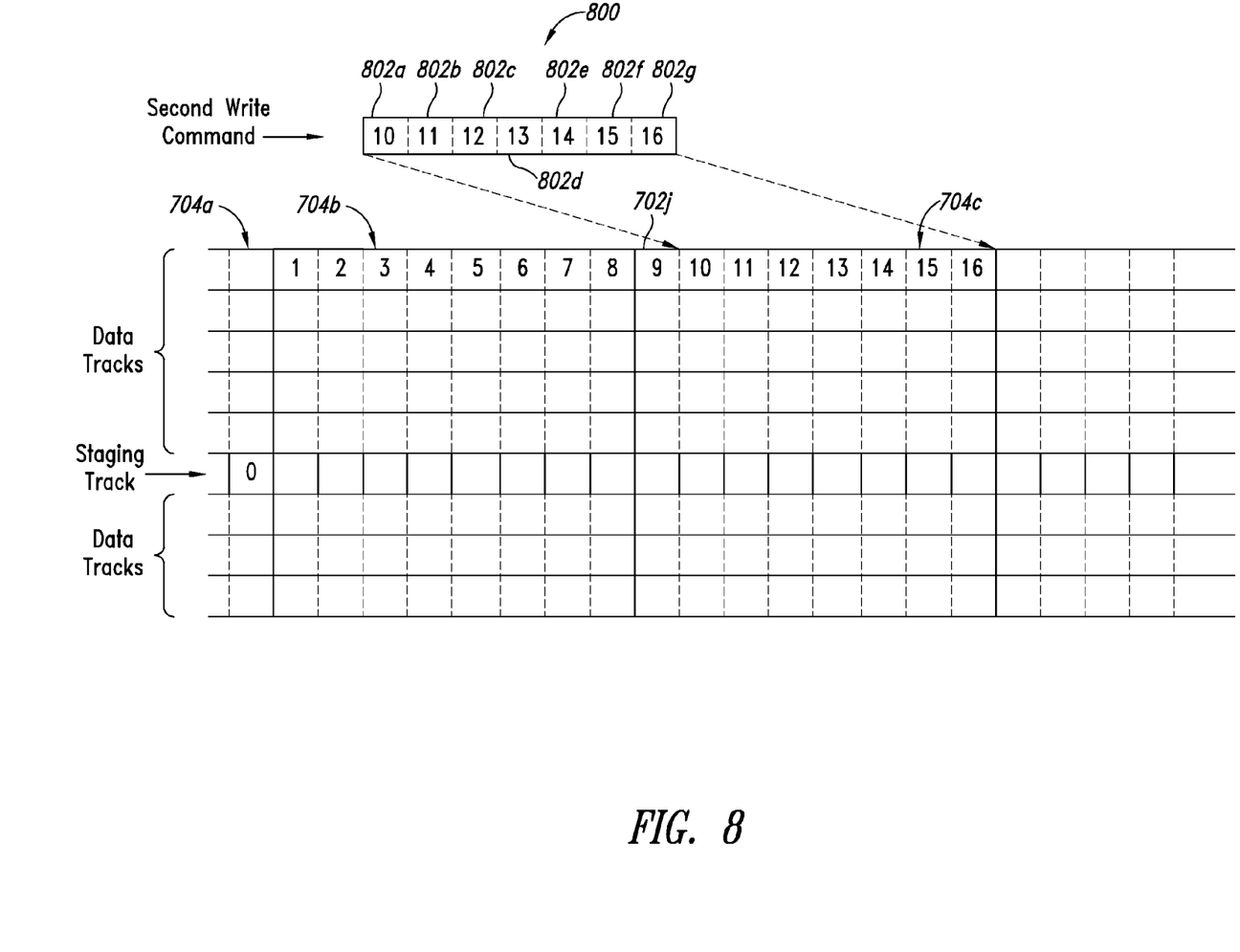
FIG. 8 is a schematic view of the disk surface of FIG. 4 after a write operation has been performed, based on the write command partially staged at FIG. 7 and on a second write command associated with a plurality of data blocks, according to one illustrated embodiment.

As illustrated in FIG. 8, a second write command 800 may be associated with a plurality of data blocks 802a-g (collectively 802) and corresponding LBAs. In particular, the second write command 800 may be associated with a second data block 802a and a second LBA ("10") of that second data block 802a.

At act 312, it is determined that the physical sector on the disk 2 associated with the logical block address of the data block is further associated with the second logical block address of the second data block. As illustrated in FIG. 8, the physical sector 704c associated with the LBA of the data block 702j is further associated with the second LBA of the second data block 802a. That is, the target logical sectors for both the data block 702j and the second data block 802a are located within the same physical sector 704c. Indeed, the second write command 800 includes a plurality of data blocks 802 having LBAs that are associated with the physical sector 704c.

Figure 9:
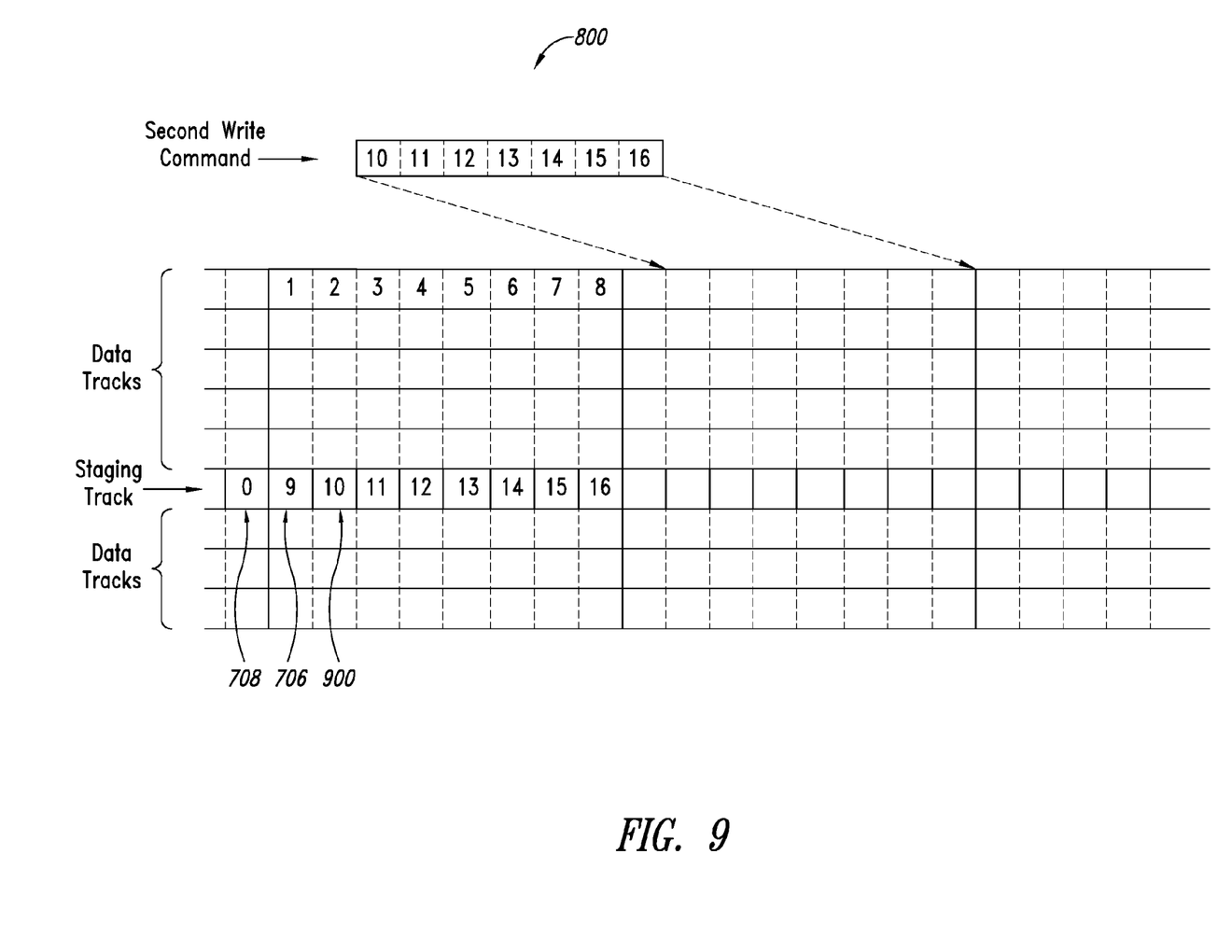
FIG. 9 is a schematic view of the disk surface of FIG. 4 after a staging operation has been performed, based on the second write command of FIG. 8, according to one illustrated embodiment.

In one embodiment, after act 312, the data block 702j and the data blocks 802 may be written to the physical sector 704c without first staging the data blocks 802. For example, as shown in FIG. 8, if the entire physical sector 704c can be filled by the data blocks 702j, 802 associated with the first and second write commands 700, 800, then the data blocks 702j, 802 may be combined and written to the physical sector 704c together. However, in other embodiments, at least some of the data blocks 802 associated with the second write command 800 may instead be written to staging sectors, as illustrated in FIG. 9.

At act 314, the second data block 802a is written to a second staging sector 900 in a spatial arrangement with the staging sector 706 of the data block 702j that corresponds to a relationship between the second logical block address and the logical block address. One exemplary spatial arrangement is illustrated in FIG. 9. As shown therein, data blocks associated with consecutive LBAs may be written in consecutive staging sectors. In one embodiment, a plurality of data blocks 802 may be written to staging sectors in spatial arrangements that correspond to the relationship between their respective LBAs and the LBA of the data block 702j. In other embodiments, a variety of spatial arrangements between different LBAs may be reflected in the staging area.

In one embodiment, in order to facilitate the staging operation of act 314, additional staging sectors corresponding to the physical sector size of the physical sector 704c may be allocated, and the second staging sector 900 may comprise one of the additional staging sectors. For example, staging sectors located proximate the staging sector 706 of the data block 702j may be allocated at act 304 in a spatial arrangement identical to that of the spatial arrangement of proximate logical sectors in the physical sector 704c.

At act 316, a second write response is sent to the host computer 10, the second write response indicating that the second write command has been successfully completed. The second write response may be formatted and sent in a manner similar to the write response sent at act 306.

Figure 10:
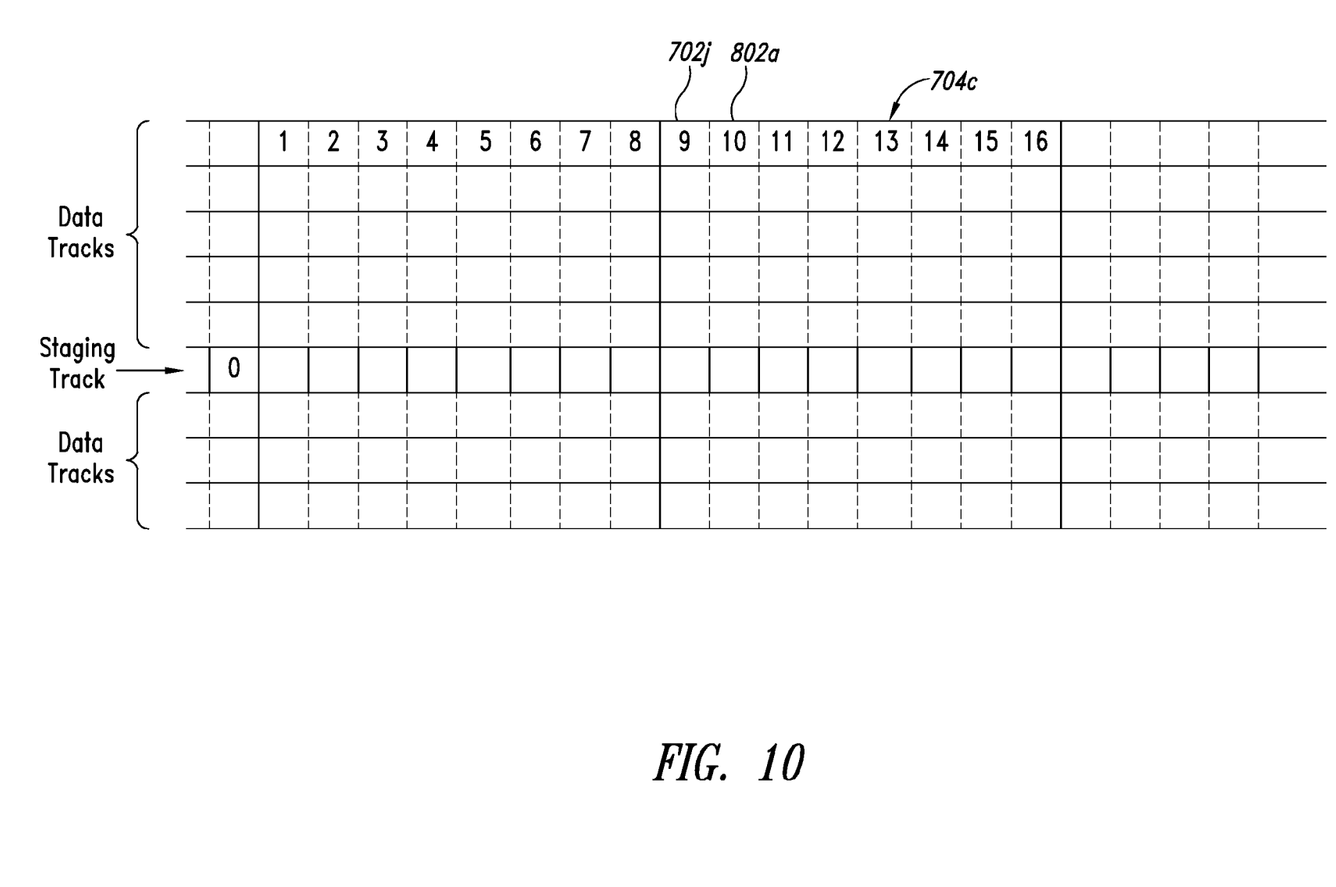
FIG. 10 is a schematic view of the disk surface of FIG. 4 after a write operation has been performed, based on the write command partially staged at FIG. 7 and on the second write command staged at FIG. 9, according to one illustrated embodiment.

At act 318, the data block 702*j* and the second data block 802*a* are written to the physical sector 704*c* together. As illustrated in FIG. 10, a plurality of data blocks 702*j*, 802 may be written to the physical sector 704*c* together. In one embodiment, these data blocks 702*j*, 802 may first be read from their respective staging sectors and then written to the physical sector 704*c*. However, in other embodiments, one or more of the data blocks 702*j*, 802 may be resident in a cache (e.g., in the memory 8) and may be written to the physical sector 704*c* based on this cached information.

The act 318 may be performed at any time. In one embodiment, the act 318 may be performed after the act 316 has been performed. For example, it may be performed while the disk drive 1 is receiving a relatively low frequency of commands from the host computer 10.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

We claim:

1. A method of operating a disk drive having a disk, the method comprising:
    receiving a write command from a host computer, the write command associated with a data block and a logical block address of the data block, a logical sector size of the data block being smaller than a physical sector size of a physical sector on the disk associated with the logical block address;
    writing the data block to a staging sector located in non-volatile media of the disk drive based at least in part on the logical sector size being smaller than the physical sector size;
    sending a write response to the host computer, the write response indicating that the write command has been completed; and
    after sending the write response to the host computer, writing the data block to the physical sector on the disk.

2. The method of claim 1, further comprising determining that additional data blocks associated with the write command do not fill the physical sector associated with the logical block address, and wherein writing the data block to the staging sector is further based at least in part on the determination that the additional data blocks do not fill the physical sector.

3. The method of claim 1, further comprising determining that additional data blocks associated with additional write commands do not fill the physical sector associated with the logical block address, and wherein writing the data block to the staging sector is further based at least in part on the determination that the additional data blocks do not fill the physical sector.

4. The method of claim 1, wherein a staging sector size of the staging sector is substantially equal to the logical sector size of the data block.

5. The method of claim 1, wherein the logical sector size is 512 bytes, and the physical sector size is 1 kilobyte.

6. The method of claim 1, wherein the logical sector size is 512 bytes, and the physical sector size is 4 kilobytes.

7. The method of claim 1, wherein the non-volatile media comprises physical locations on the disk.

8. The method of claim 7, wherein the disk includes a pattern of tracks, the pattern of tracks including staging tracks associated with staging sectors alternating with addressable data tracks associated with physical sectors.

9. The method of claim 8, wherein the pattern of tracks includes between 50 and 150 consecutive addressable data tracks alternating with between 1 and 5 staging tracks.

10. The method of claim 8, wherein writing the data block to the staging sector includes writing the data block to one of the staging tracks.

11. The method of claim 1, wherein the non-volatile media comprises a non-volatile flash memory.

12. The method of claim 1, wherein the staging sector is not logically addressable by the host computer.

13. The method of claim 1, wherein writing the data block to the physical sector on the disk includes reading a physical data block stored at the physical sector, modifying the physical data block to include the data block, and writing the modified physical data block to the physical sector.

14. The method of claim 13, wherein modifying the physical data block to include the data block includes writing portions of the physical data block to additional staging sectors proximate the staging sector storing the data block, the portions of the physical data block and the data block forming the modified physical data block.

15. The method of claim 14, wherein writing the modified physical data block to the physical sector includes reading the modified physical data block from the staging sector and from the additional staging sectors.

16. The method of claim 1, wherein writing the data block to the physical sector on the disk includes writing the data block to the physical sector on the disk while the disk drive is receiving a relatively low frequency of commands from the host computer.

17. The method of claim 16, wherein writing the data block to the physical sector on the disk includes writing the data block to the physical sector on the disk during at least one of a startup process and a shutdown process of the disk drive.

18. The method of claim 1, further comprising:
    receiving a second write command from the host computer, the second write command associated with a second data block and a second logical block address of the second data block;
    determining that the physical sector on the disk associated with the logical block address of the data block is further associated with the second logical block address of the second data block;
    writing the second data block to a second staging sector in a spatial arrangement with the staging sector of the data block that corresponds to a relationship between the second logical block address and the logical block address;
    sending a second write response to the host computer, the second write response indicating that the second write command has been successfully completed; and wherein writing the data block to the physical sector on the disk includes writing the data block and the second data block to the physical sector together.

19. The method of claim 18, wherein writing the data block to the staging sector includes allocating additional staging sectors corresponding to the physical sector size of the physical sector, and wherein the second staging sector comprises one of the additional staging sectors.

20. The method of claim 1, further comprising creating a staging list associating the staging sector with the logical block address of the data block.

21. The method of claim 20, further comprising storing the staging list on the non-volatile media.

22. The method of claim 1, wherein writing the data block to the physical sector on the disk includes writing the data block to the physical sector on the disk in response to a flush command from the host computer.

23. A disk drive comprising:
a disk;
a head actuatable over the disk, the head operable to write to and read from the disk;
a controller operable to execute instructions; and
a memory coupled to the controller and having computer-readable instructions stored thereon that are executable by the controller in order to cause the controller to process a write command received from a host computer, the write command associated with a data block and a logical block address of the data block, a logical sector size of the data block being smaller than a physical sector size of a physical sector on the disk associated with the logical block address, the instructions causing the controller to:
write the data block to a staging sector located in non-volatile media of the disk drive based at least in part on the logical sector size being smaller than the physical sector size;
send a write response to the host computer, the write response indicating that the write command has been completed; and
after sending the write response to the host computer, write the data block to the physical sector on the disk.

24. The disk drive of claim 23, wherein the memory has further computer-readable instructions stored thereon that are executable by the controller in order to cause the controller to determine that additional data blocks associated with the write command do not fill the physical sector associated with the logical block address, and wherein writing the data block to the staging sector is further based at least in part on the determination that the additional data blocks do not fill the physical sector.

25. The disk drive of claim 23, wherein the memory has further computer-readable instructions stored thereon that are executable by the controller in order to cause the controller to determine that additional data blocks associated with additional write commands do not fill the physical sector associated with the logical block address, and wherein writing the data block to the staging sector is further based at least in part on the determination that the additional data blocks do not fill the physical sector.

26. The disk drive of claim 23, wherein a staging sector size of the staging sector is substantially equal to the logical sector size of the data block.

27. The disk drive of claim 23, wherein the logical sector size is 512 bytes, and the physical sector size is 1 kilobyte.

28. The disk drive of claim 23, wherein the logical sector size is 512 bytes, and the physical sector size is 4 kilobytes.

29. The disk drive of claim 23, wherein the non-volatile media comprises physical locations on the disk.

30. The disk drive of claim 29, wherein the disk includes a pattern of tracks, the pattern of tracks including staging tracks associated with staging sectors alternating with addressable data tracks associated with physical sectors.

31. The disk drive of claim 30, wherein the pattern of tracks includes between 50 and 150 consecutive addressable data tracks alternating with between 1 and 5 staging tracks.

32. The disk drive of claim 30, wherein the instructions causing the controller to write the data block to the staging sector include instructions causing the controller to write the data block to one of the staging tracks.

33. The disk drive of claim 23, further comprising a non-volatile flash memory, and wherein the non-volatile media comprises the non-volatile flash memory.

34. The disk drive of claim 23, wherein the staging sector is not logically addressable by the host computer.

35. The disk drive of claim 23, wherein the instructions causing the controller to write the data block to the physical sector on the disk include instructions causing the controller to read a physical data block stored at the physical sector, modify the physical data block to include the data block, and write the modified physical data block to the physical sector.

36. The disk drive of claim 35, wherein the instructions causing the controller to modify the physical data block to include the data block include instructions causing the controller to write portions of the physical data block to additional staging sectors proximate the staging sector storing the data block, the portions of the physical data block and the data block forming the modified physical data block.

37. The disk drive of claim 36, wherein the instructions causing the controller to write the modified physical data block to the physical sector include instructions causing the controller to read the modified physical data block from the staging sector and from the additional staging sectors.

38. The disk drive of claim 23, wherein the instructions causing the controller to write the data block to the physical sector on the disk include instructions causing the controller to write the data block to the physical sector on the disk while the disk drive is receiving a relatively low frequency of commands from the host computer.

39. The disk drive of claim 38, wherein the instructions causing the controller to write the data block to the physical sector on the disk include instructions causing the controller to write the data block to the physical sector on the disk during at least one of a startup process and a shutdown process of the disk drive.

40. The disk drive of claim 23, wherein the memory has further computer-readable instructions stored thereon that are executable by the controller in order to cause the controller to process a second write command received from the host computer, the second write command associated with a second data block and a second logical block address of the second data block, the instructions causing the controller to:
determine that the physical sector on the disk associated with the logical block address of the data block is further associated with the second logical block address of the second data block;
write the second data block to a second staging sector in a spatial arrangement with the staging sector of the data block that corresponds to a relationship between the second logical block address and the logical block address; and
send a second write response to the host computer, the second write response indicating that the second write command has been successfully completed; and wherein the instructions causing the controller to write the data block to the physical sector on the disk include instructions causing the controller to write the data block and the second data block to the physical sector together.

41. The disk drive of claim 40, wherein the instructions causing the controller to write the data block to the staging sector include instructions causing the controller to allocate additional staging sectors corresponding to the physical sector size of the physical sector, and wherein the second staging sector comprises one of the additional staging sectors.

42. The disk drive of claim 23, wherein the memory has further computer-readable instructions stored thereon that are executable by the controller in order to cause the controller to create a staging list associating the staging sector with the logical block address of the data block.

43. The disk drive of claim 42, wherein the memory has further computer-readable instructions stored thereon that are executable by the controller in order to cause the controller to store the staging list on the non-volatile media.

44. The disk drive of claim 23, wherein the instructions causing the controller to write the data block to the physical sector on the disk include instructions causing the controller to write the data block to the physical sector on the disk in response to a flush command from the host computer.

45. A disk drive comprising:
  means for receiving a write command from a host computer, the write command associated with a data block and a logical block address of the data block, a logical sector size of the data block being smaller than a physical sector size of a physical sector on the disk associated with the logical block address;
  means for writing the data block to a staging sector located in non-volatile media of the disk drive based at least in part on the logical sector size being smaller than the physical sector size;
  means for sending a write response to the host computer, the write response indicating that the write command has been completed; and
  means for writing the data block to the physical sector on the disk after sending the write response to the host computer.

* * * * *